United States Patent [19]

Yagi

[11] Patent Number: 5,994,750

[45] Date of Patent: *Nov. 30, 1999

[54] MICROSTRUCTURE AND METHOD OF FORMING THE SAME

[75] Inventor: Takayuki Yagi, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/552,936

[22] Filed: Nov. 3, 1995

[30] Foreign Application Priority Data

Nov. 7, 1994 [JP] Japan .................................. 6-272109

[51] Int. Cl.$^6$ ................................................... H01L 29/82
[52] U.S. Cl. ......................... 257/415; 430/311; 310/309; 361/207; 200/181
[58] Field of Search ............................. 257/415; 431/11, 431/311, 319; 310/309; 361/207, 233; 200/181

[56] References Cited

U.S. PATENT DOCUMENTS

| | | | |
|---|---|---|---|
| 5,221,415 | 6/1993 | Albrecht et al. | 156/629 |
| 5,572,060 | 11/1996 | Butler et al. | 257/467 |

FOREIGN PATENT DOCUMENTS

| | | | |
|---|---|---|---|
| 0417523 | 3/1991 | European Pat. Off. | G02B 26/08 |
| 0534406 | 3/1992 | European Pat. Off. | G01B 7/34 |
| 0491973 | 7/1992 | European Pat. Off. | G01N 27/00 |
| 0611129 | 8/1994 | European Pat. Off. | H01L 21/58 |
| 0665590 | 8/1995 | European Pat. Off. | H01L 23/00 |
| 2-8812 | 1/1990 | Japan | G02F 1/03 |

OTHER PUBLICATIONS

Brugger, J., et al., "Microlever with combined integrated sensor/actuator functions for scanning force microscopy", Sensors and Actuators A (Physical), May 1994, pp. 339–345.

Zhu, J., et al. "A Micro Step Motion of Polysilicon Structures on Silicon Substrate", Processing Of the Japan International Electronic Manufacturing Technology Symposium, 1993, No. Symp. 14, pp. 85–88.

M. Mehregany et al. "Operation of Microfabricated Harmonic and Oridinary Side–drive Motors", Proc. IEEE Micro Electro Mechanical Systems Workshop, pp. 1–8 (1990).

P. Cheung et al., "Modeling and Position–detection of a Polysilicon Linear Microactuator", *Micromechanical Sensors, Actuators and Systems*, ASME DSC–vol. 32, pp. 269–278 (1991).

Y. Gianchandan et al., "Micron–sized, High Aspect Ratio Bulk Silicon Micro Mechanical Devices", Proc IEEE Micro Electromechanical Systems Workshop.

B. Kloeck et al., "Study of Electrochemical Etch–Stop for High–Precision Thickness Control of Silicon Membranes", IEEE Trans. on Electron Devices, vol. 364, pp. 663–669 (1989).

C.A. Spindt, "Physical Properties of Thin–Film Field Emission Cathodes with Molybdenum Cones", *J. Appl. Phys.*, 47, pp. 5248–5263 (1976).

B. Diem et al., SOI (SIMOX) as a Substrate for Surface Micromachining of Single Crystalline Silicon Sensors and Actuators, 7th Int'l Conf. on Solid–State Sensors and Actuators, pp. 233–236, Jun. 1993.

S. Nonogaki, ed., *New Materials of Polymers, One Point Series*, vol. 3 —*Micromachining and Resist*, Japan Polymer Society, Kyoritsu Pub. Co., Ltd., pp. 11–16 (1990).

*Primary Examiner*—Sara Crane
*Attorney, Agent, or Firm*—Fitzpatrick, Cella, Harper & Scinto

[57] ABSTRACT

There is provided a microstructure comprising a substrate, support members, a lever and an electrode formed on the lever is characterized in that said support members support said substrate and said beam and/or the electrode section with a void interposed therebetween and an electrode is formed on the lower surface of said beam. There are also provided a method of forming such a microstructure and an electrostatic actuator having a beam that is displaced by applying a voltage to the electrodes of the actuator.

17 Claims, 8 Drawing Sheets

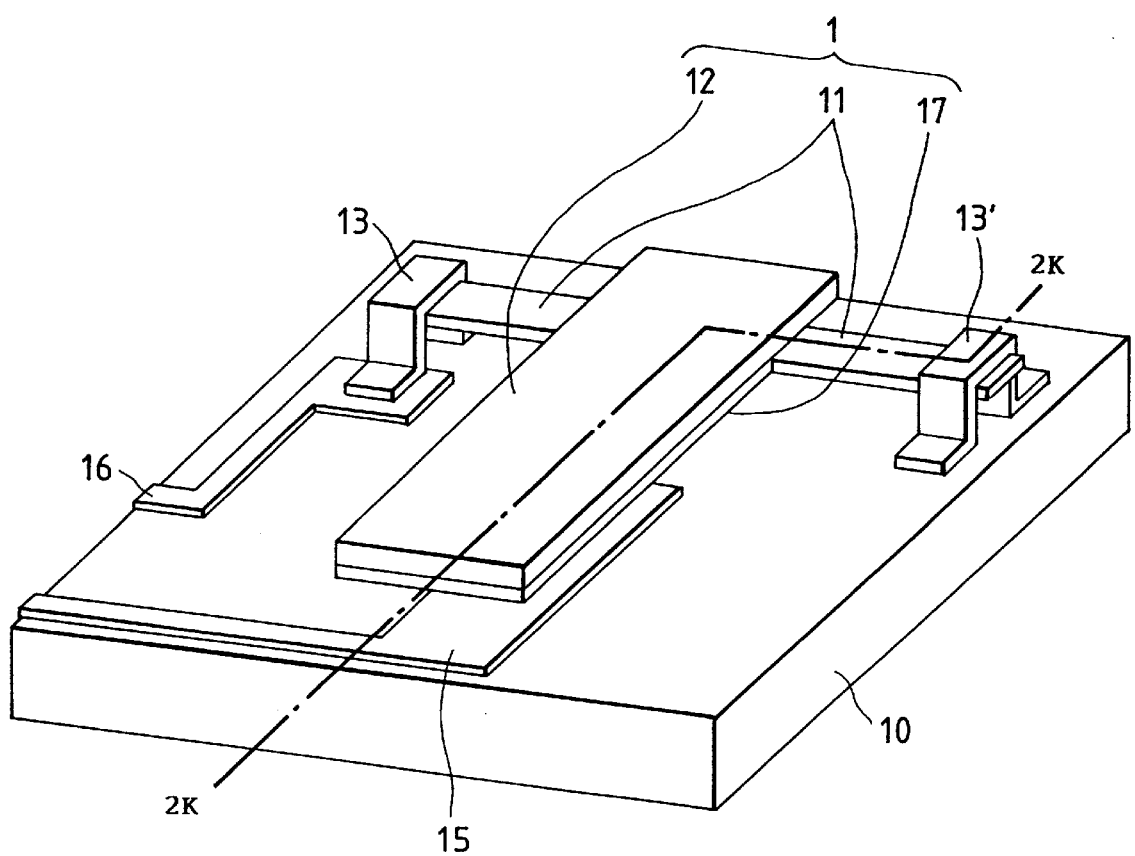

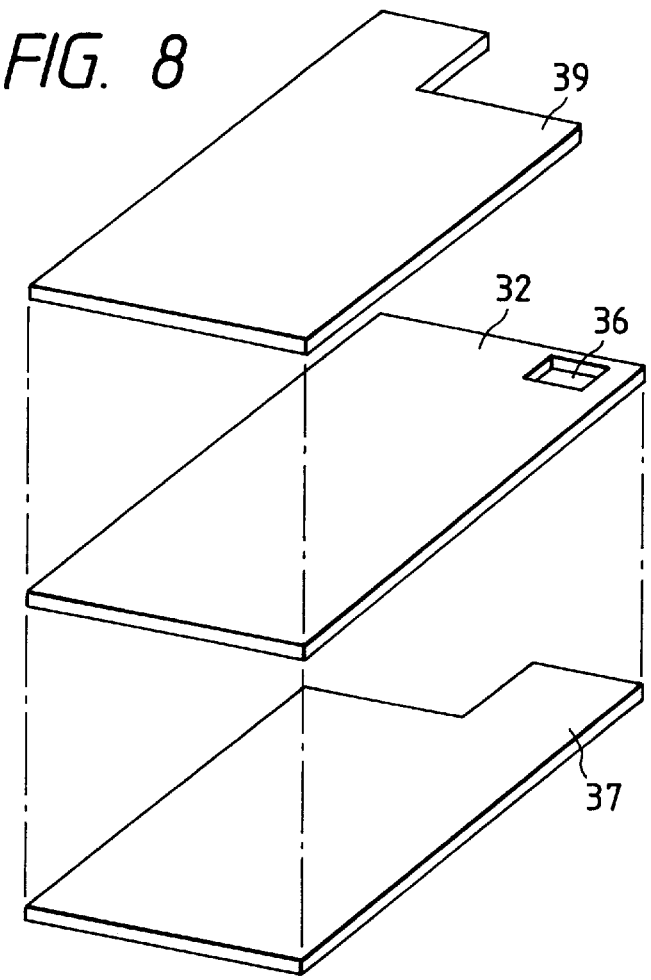
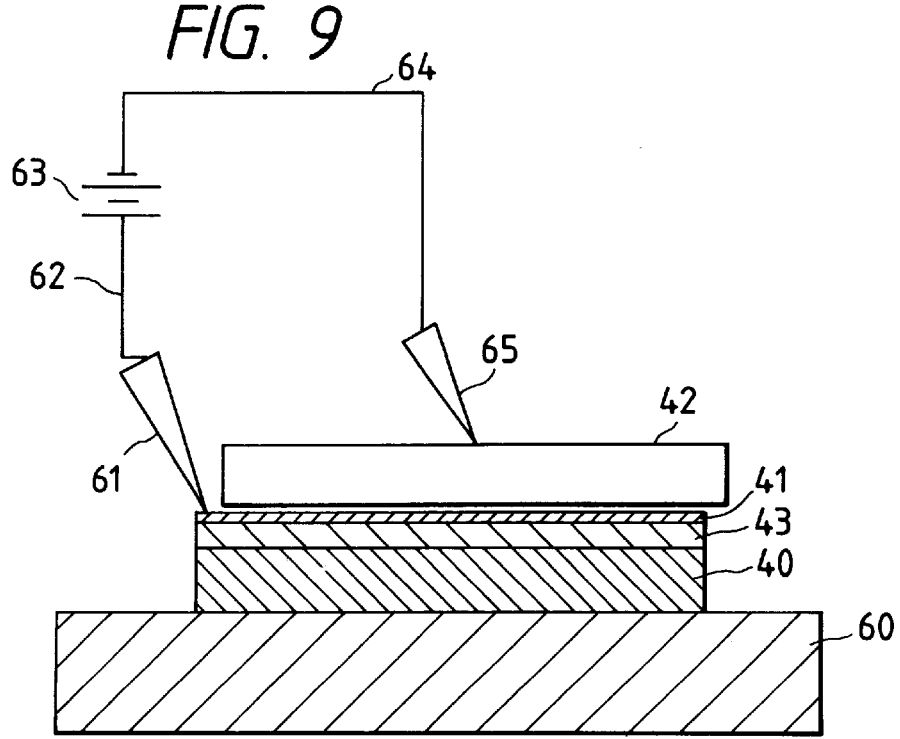

MICROSTRUCTURE AND METHOD OF FORMING THE SAME

BACKGROUND OF THE INVENTION

1. Field of the Invention

This invention relates to a microstructure to be prepared by means of micromechanical technologies and it also relates to a method of forming a microstrucuture by using a sacrificial layer.

2. Related Background Art

In recent years, studies have been made to produce minute machines comprising small one or more than one mechanisms by means of micromechanical technologies. In particular, such a microstructure realized by applying technologies developed for forming semiconductor integrated circuits (semiconductor photolithography process) can be used to produce a number of minute mechanical components on a common substrate on a highly reproducible basis. Thus, minute components can be prepared for minute machines at reduced cost and such minute components provide an enhanced responsiveness if compared with conventional mechanical structures.

Three typical methods are popularly known for manufacturing a microstructure on a substrate. Firstly, there is a method for producing a microstructure such as a wobble micromotor of polysilicon film (M. Mehregany et al., "Operation of microfabricated harmonic and ordinary side-drive motors", Proceedings IEEE Micro Electro Mechanical Systems Workshop, 1990, pp. 1–8) or a linear microactuator (P. Cheung et al., "Modeling and position-detection of a polysilicon linear microactuator", Micromechanical Sensors, Actuators and Systems ASME 1991, DS C-Vol. 32, pp. 269–278), with which a sacrificial layer of silicon dioxide film and a thin silicon film of polysilicon, SOI (Si on Insulator) or SIMOX (Separation by ion implantation of oxygen) (B. Diem et al., "SOI (SIMOX) as a Substrate for Surface Micromachining of Single Crystalline Silicon and Actuators", The 7th International Conference on Solid-State Sensors and Actuators, transducers '93, Jun. 7–10, 1993, pp. 233–236) formed to produce a microstructure are patterned to show a desired profile and subsequently the silicon dioxide film is used as a sacrificial layer and removed with an aqueous solution of fluorine.

However, since this method involves the use of an aqueous solution of fluorine in order to etch out the silicon dioxide, a material that resists corrosion by fluoric acid has to be selected for the microstructure and hence such corrosive substances as aluminum cannot be used for the electrodes of the microstructure. Additionally, the polysilicon of the microstructure has to be controlled for its membrane stress in order to prevent it from warping. If an SOI substrate is used, the silicon dioxide supporting the microstructure can be etched back to consequently reduce the microstructure to show a beam-shaped profile and make it difficult to electrically connect the substrate and the structure when the silicon dioxide lying under the bulk Si thin film is removed.

Secondly, there is a known a method of forming a spatial light modulator comprising a micromirror of an aluminum (Al) thin film (L. J. Hornbeck, Japanese Patent Application Laid-Open No. 2-8812) by applying photoresist onto a substrate to form a sacrificial layer, forming thereon an Al thin film, patterning the Al film to a desired profile and thereafter removing the photoresist by dry etching using oxygen plasma to produce a microstructure comprising an Al thin film.

With this technique, it is possible to form a microstructure on a substrate selected from a variety of candidates because the sacrificial layer is made of photoresist, the use of which is not restricted by the surface coarseness of the substrate. Thus, the sacrificial layer can be removed by drying etching using the technology of reactive ion etching (RIE) and any possible sticking phenomenon that may appear between the microstructure and the substrate if a wet etching technique is used to remove the sacrificial layer can be successfully avoided. However, the process of forming the aluminum thin film for the structure has to be conducted at temperature that is low enough to prevent photoresist from being damaged by heat to impose rather rigorous restrictions on the selection of material for the microstructure. Additionally, since the microstructure is produced by means of a thin film forming technique such as vacuum deposition or sputtering, the membrane stress of the thin film has to be so controlled as to prevent the microstructure from being warped by the membrane stress.

Last but not least, there is known a method of forming the pattern of a microstructure on a bulk Si substrate, coupling part of the pattern to the glass substrate by anode coupling and etching the coupled Si substrate from the rear surface in such a way that only the microstructure is left on the glass substrate. A linear actuator made of bulk Si thin film formed from an Si substrate (Y. Gianchandani et al., "Micro-Size High Aspect Ratio Bulk Silicon Micromechanical Devices", Proceedings IEEE Micro Electro Mechanical Systems Workshop, 1992, pp. 208–213) and a cantilever for an AFM (Atomic Force Microscope) made of silicon nitride film (T. A. Albrecht et al., U.S. Pat. No. 5,221,415) can be prepared with this technique.

Since this method does not involve the use of a sacrificial layer, a microstructure can be made of a material that may be corroded by fluoric acid. However, since it has to be coupled with glass by anode coupling, candidate materials are limited to electroconductive silicon that can be easily oxidized, metals such as Si, Al, Ti and Ni and silicon nitride or oxide that can be anode-coupled only in the form of a thin film formed on a Si substrate. Additionally, since the process of anode coupling has to be conducted at temperature higher than 300° C., the glass to be coupled with a microstructure is required to show a thermal expansion coefficient substantially equal to that of the Si substrate. Thus, glass that can be used with this method is limited to Pyrex glass (e.g., #7740 Corning: tradename). Additionally, since a void has to be formed in advance on the coupling surface, electrodes cannot be arranged on the microstructure after the coupling operation. Moreover, since the substrate has to be made of glass containing mobile ions, circuits cannot be formed on the substrate to a high degree of integration. Finally, since the surface coarseness of the glass and the electroconductive material has to be held to less than 500 angstroms for coupling the glass and the electroconductive material by anode coupling, they cannot be coupled on stepped wires.

SUMMARY OF THE INVENTION

In view of the above identified problems, it is therefore an object of the present invention to provide a microstructure:

(1) that is free from restrictions on the material of the microstructure and that of its substrate; and (2) allows electric connection between the microstructure having an electrode pattern and its substrate as well as a method for forming such a microstructure.

According to the invention, the above object is achieved by providing a method of forming a microstructure characterized in that it comprises steps of forming a structure layer on a second substrate, forming an electrode section of a conductive material on the structure layer, forming an adhesive layer of resin film on first and/or second substrates, joining the first substrate and a set of the structure layer and electrode section with the adhesive layer, removing the second substrate, forming a support layer for connecting the structure layer and electrode section and the first substrate and removing the adhesive layer.

A microstructure formed by the above method comprises a substrate, a support section and a beam having at least one electrode characterized in that the support section suspends the beam separated from the substrate by avoid, i.e. an air space and is attached to the upper surface of the beam, and at least one of the electrodes is a movable electrode formed on the lower surface of the beam.

According to the present invention, there is also provided an electrostatic actuator comprising a substrate, fixed and drive electrodes formed on the substrate and a beam having a movable electrode which beam is supported above the drive electrode by a support section of metal thin film through a void interposed between the drive electrode and the beam, characterized in that the movable electrode is formed on the lower surface of the beam and the support section electrically connects the movable electrode with the fixed electrode and mechanically holds the beam at the upper surface of the beam such that the beam can be displaced by applying a voltage between the drive electrode and the movable electrode.

With the method of forming a microstructure according to the present invention, the microstructure is formed by joining the first substrate and the structure layer formed on the second substrate and electrode section formed on the structure layer with the adhesive layer of resin film formed on either the first substrate or the second substrate, removing the second substrate, connecting mechanically a set of the structure layer and electrode section to the first substrate by means of the support layer, and removing the adhesive layer so that the microstructure may be made of a material selected from various substances such as insulators, metals and semiconductors. Thus, electrode patterns may be formed on the upper and/or lower surfaces of the microstructure to make it electrically connectable with the substrate.

Since the structure layer is formed in a step different from that of forming the first substrate, they are not limited in terms of materials for forming them.

Additionally, since a bulk (crystalline) material can be used for the beam, the beam is made free from warping.

Still additionally, since the resin film is an adhesive layer for joining the first substrate and the second substrate and, at the same time, plays the role of a sacrificial layer for forming the microstructure, the resin film can be removed by dry etching using oxygen gas so that the problem of sticking that accompanies the known techniques of removing a sacrificial layer can be effectively avoided.

The resin film can be made to show a planar surface regardless of unevenness that may be produced by the electrode patterns on the substrate so that the substrate can be joined well without depending on the roughness of the surfaces of the substrates.

With the method of the present invention, a microstructure can be formed by a process to be conducted at relatively low temperature so that a substrate having a thermal expansion coefficient largely differing from that of the material of the microstructure may be used.

The movable electrode formed on the beam of an electrostatic actuator prepared by the method of the present invention can be arranged on the lower surface of the beam so that the distance between the movable electrode and the drive electrode formed on the substrate can be minimized to consequently reduce the drive voltage.

With the method of forming a microstructure according to the invention, the pattern of the drive electrode and that of the structure may be formed, disregarding each other.

Further, since the movable electrode which is finally placed opposite to the first substrate after the formation of the structure layer, it is possible to form a beam of a flat structure layer regardless of steps that may be found on the pattern of the movable electrode.

BRIEF DESCRIPTION OF THE DRAWINGS

FIG. 3 is a schematic perspective view of an electrostatic actuator prepared by the method of forming a microstructure according to the invention.

FIG. 8 is an exploded schematic view of the beam section of an electrostatic actuator prepared by the method of forming a microstructure according to the invention, illustrating the multilayer structure of the beam.

FIG. 9 is a schematic sectional view of an electrostatic actuator prepared by the method of forming a microstructure according to the invention, illustrating the step of forming a silicon dioxide film for a structure layer on the second substrate with a sacrificial layer for pattern transfer interposed therebetween.

DETAILED DESCRIPTION OF PREFERRED EMBODIMENTS

Figure 1A:
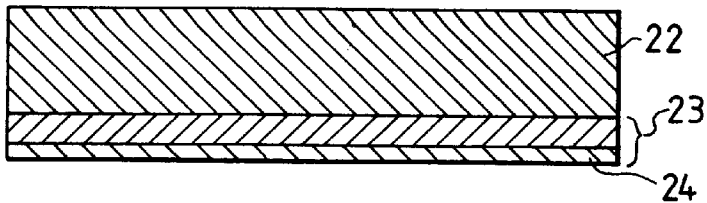
FIGS. 1A to 1F are schematic illustrations showing steps of forming a microstructure in a mode of carrying out the method according to the invention.

Now, the present invention will be described by referring to the accompanying drawings that illustrate preferred embodiments of the invention.

A known appropriate method can be used for forming an adhesive layer. For instance, a resin material may be diluted in an organic solvent and applied onto a substrate by means of a spinner, dipping or spraying technique to produce a resin film. With such an application technique, a flat resin film having a planar surface can be formed on the substrate, if it has a rough surface at the beginning, by which it is possible to join the surface and that of the other substrate without depending on the roughness of the surface. When a resin film is formed on an Si substrate carrying thereon integrated circuits, photoresist containing little impurities such as sodium ions may preferably be used for the resin film. Another material that may preferably used for the resin film is rubber type photoresist containing rubber that is highly adhesive and mechanically strong.

For the purpose of the present invention, rubber as described in "Micromachining and Resist" (Saburo Nonogaki, ed. Japan Polymer Society, Kyoritu Publishing Co., Ltd., 1990, 1. 3, p. 11) may preferably used for rubber type resist. High resolution negative type photoresist available from Tokyo Ohka Kogyo Co., Ltd and containing rubber such as OMR-83 may also preferably be used for the purpose of the invention.

A substrate carrying thereon the pattern of a structure formed by a combination of a semiconductor photolithography process and an etching process, a substrate carrying thereon a structure layer of thin film formed on a second substrate or a second substrate carrying thereon a structure layer with a sacrificial layer for pattern transfer interposed therebetween may suitably be used for the second substrate with a structure layer formed thereon.

If a substrate carrying thereon the pattern of a structure formed by a combination of a semiconductor photolithography process and an etching process or a substrate carrying thereon a structure layer of thin film formed on a second substrate is selected, the substrate is scraped from the rear side until the structure layer is left there in the step of removing the second substrate by means of wet etching using an etching solution suitably selected for the substrate, dry etching using reactive gas or a technique of lapping the substrate with polishing granules. For instance, if the second substrate is made of Si, an alkaline aqueous solution such as a potassium hydroxide solution (KOH) or a tetramethyl ammonium hydroxide solution or an aqueous solution of a mixture of fluoric acid and nitric acid may preferably be used for the etching solution and a plasma gas containing $CF_4$, $SF_6$ or $NF_3$ may preferably be used for the reactive gas. If an Si wafer having a pn junction is used for the structure, which is of the n-type, and the second substrate, which is of the p-type, only the structure of the n-type can be left unaffected by applying a voltage to the structure layer in an etching operation using an alkaline aqueous solution (B. Kloeck, et al., "Study of Electrochemical Etch-Stop for High-Precision Thickness Control of Silicon Membranes" IEEE TRANSACTIONS ON ELECTRON DEVICES, VOL. 36, NO. 4, pp. 663–669, 1989). If an Si bulk on which the patter of a structure is formed by etching is used for the second substrate, the produced microstructure will be free from warping so that the problem of warping given rise to by the membrane stress in the process of forming a microstructure by forming a thin film on a sacrificial layer can be effectively eliminated.

For a second substrate carrying thereon a structure layer with a sacrificial layer for pattern transfer interposed therebetween, a substrate prepared by using a glass substrate for the second substrate, forming a metal thin film as a sacrificial layer for pattern transfer and thereafter applying a voltage to the metal thin film and the glass substrate to produce a junctioned body coupled by anode coupling, a substrate having a sacrificial layer for pattern transfer of silicon dioxide and an intermediary layer of an SOI or SIMOX substrate carrying thereon a structure layer of silicon film or a junctioned body realized by forming a sacrificial layer for pattern transfer and a structure layer of thin film on the second substrate may appropriately be used. For the sacrificial layer for pattern transfer, a material that can be removed by an etchant that, however, does not corrode at least the adhesive layer and the structure layer may suitably be selected. A thin film deposition technique such as vapor deposition or CVD (chemical vapor deposition) may suitably be used for forming a thin film. If the technique of anode coupling is used, the second substrate may be a glass substrate containing mobile ion of an alkali metal (e.g. sodium) whereas the metal film may be made of a metal good for anode coupling such as Si, Al, Ti or Ni or an alloy containing any of such metals. If such a metal film is to be formed on the structure layer, a material selected from various different substances including insulators, semiconductors and metals may be bonded onto a glass substrate by anode coupling.

If the microstructure has a thickness less than tens of several micrometers, it provides a handling problem when junctioning the microstructure onto the second substrate. If such is the case, the structure layer has to be scraped to reduce its thickness after junctioning it to the second substrate. Alternatively, a substrate on which a structure layer is formed in advance may be used so that the structure layer may be left when the substrate is removed by some means. For reducing the thickness of or totally removing the substrate, a technique is selected from wet etching using an etching solution suited for the substrate, dry etching using reactive gas, lapping using grinding granules and polishing and the substrate is scraped from the rear side so that the structure layer having a desired thickness may be junctioned onto the substrate. If a bulk substrate of Si or GaAs is used, a microstructure produced as a final product of the thinned bulk is free from warping so that the problem of warping given rise to by the membrane stress in the process of forming a microstructure by forming a thin film on a sacrificial layer can be effectively eliminated. Additionally, the thickness of the junctioned layers can be appropriately regulated as they are made very thin.

In the step of forming an electrode section on the microstructure, it is produced either by forming a thin film of electroconductive body by vacuum deposition on the structure layer that has been formed on the second substrate and subsequently forming its pattern on the thin film of electroconductive body by semiconductor photolithography or by arranging a structure layer that carries thereon an electroconductive layer on the second substrate and subsequently forming its pattern on the electroconductive layer. The electroconductive layer may be a $p^+$ layer formed on an Si substrate.

In the step of joining the first substrate and the structure layer and electrode section, the first substrate is pressed against the second substrate from the rear side and then the organic solvent contained in the resin film of the adhesive layer is made to evaporate by heating the layer until the resin is heat set and consequently the force binding the substrates is increased. If the first and second substrates are electroconductive, they may be joined together by applying a voltage to each of them to generate electrostatic force there, which force is then utilized to press them against each other. When this joining step is over, the electrode section is located between the adhesive layer and structure layer.

The vapor of the organic solvent generated during the heat treatment of the adhesive layer can be made to escape to the ambient air by forming a groove on the first substrate and/or the structure layer. Any stepped portions of the pattern of the structure layer formed by semiconductor photolithography may be utilized for such grooves.

The operation of heat setting the resin film of he adhesive layer may be conducted at relatively low temperature to avoid damaging the first and second substrate because of the difference of their thermal expansion coefficients so that the first substrate may be selected appropriately without considering the difference.

In the step of removing the second substrate, the second substrate and the structure layer are separated from each other without separating the adhesive layer on the first substrate and the structure layer if the second substrate carries thereon a sacrificial layer for pattern transfer and the latter is removed. In other words, the structure on the second substrate is transferred onto the adhesive layer of the first substrate as a result of this step.

The support layer is designed to mechanically connect the first substrate and the structure layer and/or electrode section and suspend the transferred structure layer and/or electrode section from above as it is formed before removing the adhesive layer. If a metal thin film (e.g., aluminum) is used for the support layer, the structure layer and/or electrode section and the first substrate will also be connected electrically.

In the step of removing the adhesive layer of resin film, it is eliminated by wet etching, with which the resin film is dipped into a solution that dissolves the film, or by drying etching, with which the layer is ashed by oxygen plasma. Dry etching is advantageous in that it can avoid the problem of sticking that arises when the sacrificial layer is removed by wet etching.

A microstructure produced through the above steps comprises a first substrate, a support section or a support layer and a beam comprising a structure layer and an electrode, of which the beam is supported by the support section from the upper surface of the beam through a void between the beam and the substrate, the electrode being disposed on the lower surface of the beam. Then, a fixed electrode and a drive electrode are arranged on the first substrate and the structure layer is processed by patterning to produce a cantilever type or torsion beam type beam so that the electrode on the beam may become movable. With such an arrangement, the movable electrode and the fixed electrode are electrically connected by the support section and, at the same time, the beam and the drive electrode are mechanically supported by it from the upper surface of the beam to produce an electrostatic actuator where the position of the beam can be changed by applying a drive voltage to the drive electrode and the movable electrode. A microstructures manufactured by the method of the present invention may be an electrostatic actuator, a cantilever to be used for a microscope system such as an AFM or an STM (scanning tunneling microscope) for a detecting tunneling current, van der Waals force, magnetic force, electrostatic force or the like or a wiring system having an air bridge structure. In the case of an electrostatic actuator having the above described configuration, since a movable electrode is arranged on the lower surface of the beam, the distance separating the movable electrode and the drive electrode is reduced by the thickness of the beam if compared with a movable electrode arranged on the upper surface of the beam and, therefore, a relatively low drive voltage may be used to displace the beam. If the beam is made as thin as the electrode, the risk of warping of the beam that may appear due to the internal stress can be eliminated by arranging another electrode on the surface to produce a symmetrical structure.

According to the method of forming a microstructure according to the invention and having the above described configuration, the structure layer formed on the second substrate and electrode section formed on the structure layer and the first substrate are joined together with the adhesive layer of resin film formed on both or either of the first and second substrates and, thereafter, the second substrate is removed. Then, the first substrate are mechanically connect the structure layer and electrode section by the support layer, followed by removing the adhesive layer. The use of resin film for the adhesive layer allows the materials of the first substrate, the second substrate and the structure layer formed on the second substrate to be selected from a wide range of candidates and also an electrode to be formed on the structure layer before removing the resin film. Additionally, the adhesive layer can be removed by means of a solvent, ashing or heating if it is made of resin film so that the electrode section does not need to be subjected to an etching operation. Finally, the problem of sticking that arises when the sacrificial layer is removed by wet etching can be effectively avoided by dry etching the adhesive layer of resin film.

The movable electrode is arranged on the lower surface of the beam of an electrostatic actuator prepared by the method of the present invention to reduce the distance separating the drive electrode on the substrate and the movable electrode and hence the drive voltage required to operate the actuator.

EXAMPLES

Now, the method of forming a microstructure according to the invention and a microstructure prepared by such a method will be described by way of examples, referring to FIGS. 1A through 9 of the accompanying drawings.

Example 1

FIGS. 1A to 2K illustrate different steps of forming a microstructure in a mode of carrying out the method according to the invention and FIG. 3 is a schematic perspective view of a microstructure prepared by the method. As seen from FIG. 3, a microstructure according to the invention comprises a first substrate 10 which is a glass substrate, a drive electrode 15 and a fixed electrode 16 of thin film formed on the glass substrate 10, a movable electrode 17 of a $p^+$ Si layer provided with a torsion bar 11 and held on the upper surface of the torsion bar 11 by a pair of support members 13, 13' with a void interposed between itself and the substrate and a lever 12 of a patterned Si structure layer arranged on the movable electrode 17. The movable electrode and the lever constitute a beam 1. The support members 13, 13' are made of an electroconductive material such as aluminum to electrically connect the movable electrode 17 and the fixed electrode 16. The illustrated microstructure is an electrostatic actuator having a beam that can be displaced by applying a voltage to the drive electrode 15 and the fixed electrode 16, which is electrically connected to the movable electrode 17 formed on the lower surface of the beam. With such an arrangement, the movable electrode 17 is suspended by the support members 13, 13' from the upper surface of the torsion bar 11 with a void interposed between the electrode and the glass substrate, the support members 13, 13' mechanically and electrically connecting the beam and the glass substrate 10 and fixed electrode 16 by means of an air bridge structure. The torsion bar 11 is twisted to rotate and displace the lever toward the substrate as a voltage is applied to the drive electrode 15 and the movable electrode 17. Since the lever has a thickness greater than that of the torsion bar, it is not bent if a voltage is applied to the electrodes.

Since the movable electrode of the beam of the electrostatic actuator having the above described configuration is disposed on the lower surface of the lever, the distance separating the movable electrode and the drive electrode is reduced by the thickness of the lever if compared with the case where the movable electrode is arranged on the upper surface of the beam and hence a relatively low drive voltage may be used to display the beam.

In this example, a microstructure having a configuration as shown in FIG. 3 was formed through the steps of FIGS. 1A to 2K, illustrating the microstructure in cross section in different manufacturing steps. A p-type Si substrate 22 carrying thereon an n-type diffusion layer (80 Ω·cm, thickness: 3 μm) for a structure layer 23 was used for the second substrate and boron ions were injected into the diffusion layer to form a p$^+$ layer 24 (120 Ω/square, thickness: 0.5 μm) (FIG. 1A). Photoresist was applied to the substrate and subjected to a patterning operation using a photolithography process, where the applied photoresist was exposed to light and photochemically developed. Then, the p$^+$ layer 24 was etched by using the mask of the photoresist pattern and CF$_4$ gas in a reactive ion etching (RIE) process to produce a movable electrode 17. Subsequently, the photoresist was stripped off in a resist stripping solution to produce a second substrate carrying thereon a movable electrode (FIG. 1B). In other words, the movable electrode was part of a structure layer.

A glass substrate 10 (#7059 Corning: tradename) carrying thereon a drive electrode 15 and a fixed electrode 16 was used for the first substrate. The glass substrate 10 has a thermal expansion coefficient greater than that of Si by about 1.4 times. More specifically, a Cr film and an Au film were successively formed on the glass substrate 10 by electron beam vapor deposition to thicknesses of 5 nm and 200 nm respectively and a photoresist layer was subjected to a patterning operation in a photolithography process. The obtained mask of photoresist was used to produce the drive electrode 15 and the fixed electrode 16 having profiles conforming to the pattern of photoresist as shown in FIG. 3 by etching that used an Au etchant consisting of an aqueous solution of iodine and potassium iodide and a Cr etchant consisting of an aqueous solution of cerium ammonium nitrate and perchloric acid. Subsequently, a solution prepared by dissolving methyl polymethacrylate (PMMA) into methyl ethyl ketone (MEK) was applied to the glass substrate 10 with a spinner and preliminarily heated at 50° C. for ten minutes to produce an adhesive layer 26 made of PMMA and having a thickness of 2.5 μm (FIG. 1C). Care should be needed to accurately control the amount of the solvent in the solution dissolving the resin to be applied because bubbles of vapor of the solvent might be trapped between the adhesive layer and the structure layer on the second substrate during the heating process. The preliminary heating operation was conducted at temperature sufficiently low to prevent the adhesive from being heat set, paying attention to eliminate any bubbles of the evaporated solvent remaining on the interface by accurately controlling the solvent contained in the resin film. When PMMA was used, the generation of bubbles could be completely suppressed by preliminarily heating the adhesive at 50° C. for 10 minutes.

Figure 1B:
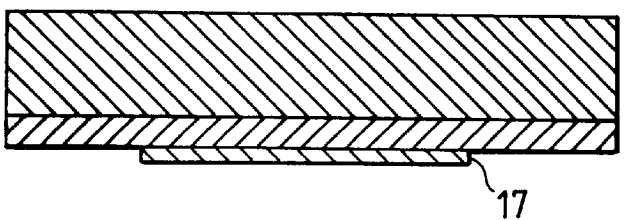
Figure 1C:
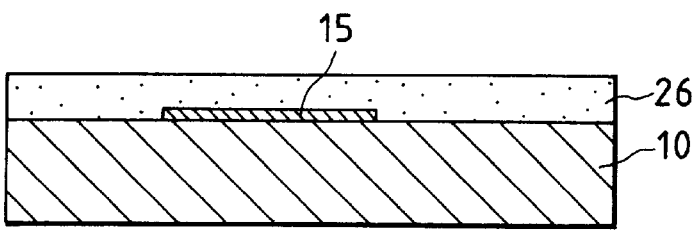

Then, the second substrate as shown in FIG. 1B and the first substrate carrying thereon an adhesive layer 26 as shown in FIG. 1C were pressed again each other from the rear sides. While the movable electrode 17 was buried in the adhesive layer 26 in this example, it may be kept unburied by controlling the pressure applied to the substrate when they are bonded together. After bonding the first substrate and the structure layer on the second substrate together with the adhesive layer disposed therebetween, the adhesive layer was heat set at 150° C.

Figure 1D:
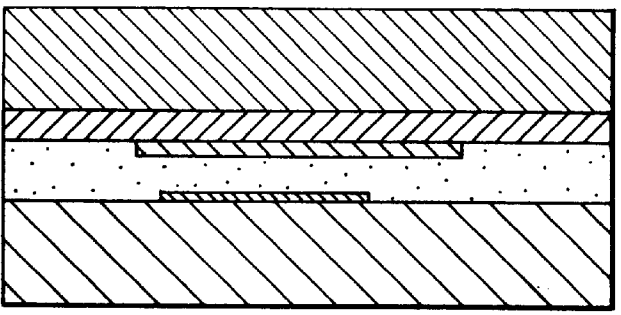
Figure 1E:
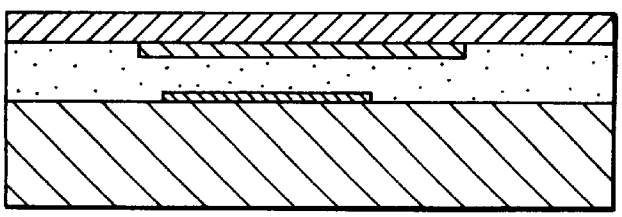
Figure 1F:
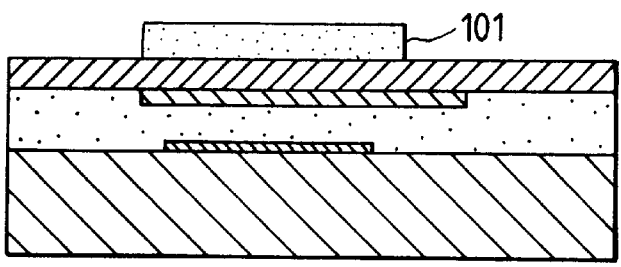
Figure 2G:
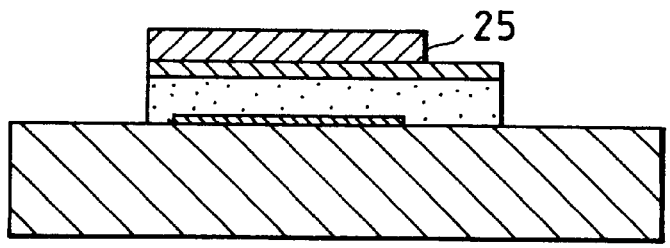
FIGS. 2G to 2K are schematic illustrations showing steps to be followed after those of FIGS. 1A to 1F.

Subsequently, the bonded substrates of FIG. 1D was subjected to electrolytic etching at 80° C. in a 30 wt % KOH solution by applying a positive voltage of 3 V to the diffusion layer relative to the natural electrode potential to remove the p-type Si substrate of the second substrate (FIG. 1E). Note that the structure layer 23 of an n-type diffusion layer was not etched by the electrolytic etching. Thereafter, a pattern was formed on the structure layer 24 in a photolithography process, where photoresist was applied to the structure layer 24, exposed to light and photochemically developed for the pattern (FIG. 1F) and then the structure layer 23 was subjected to reactive ion etching (RIE), using the mask of photoresist 101 and CF$_4$ gas to produce a lever pattern 25 of the n-type Si diffusion layer. Then, the photoresist pattern 101 was removed and, simultaneously, the adhesive layer was etched to the pattern of the lever and the torsion bar by oxygen gas (FIG. 2G).

Figure 2H:
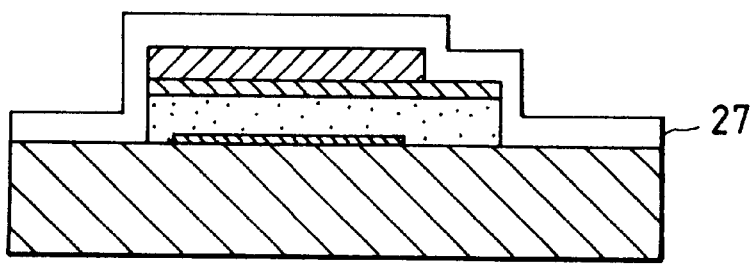
Figure 2I:
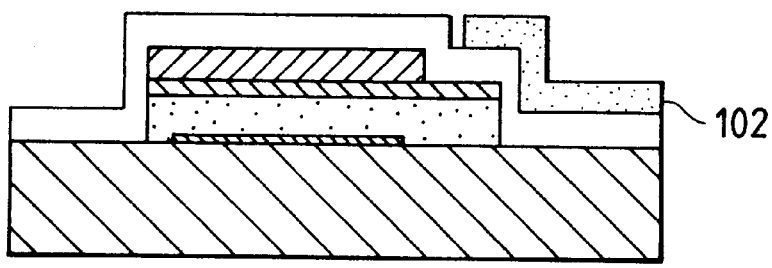
Figure 2J:
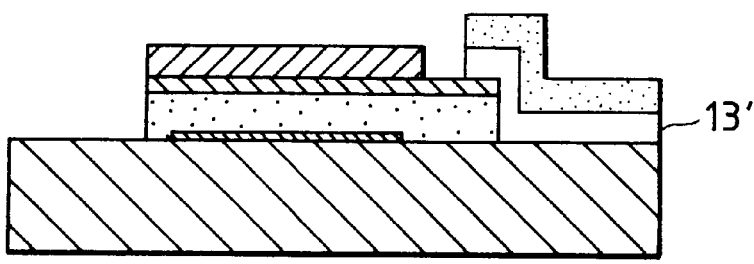
Figure 2K:
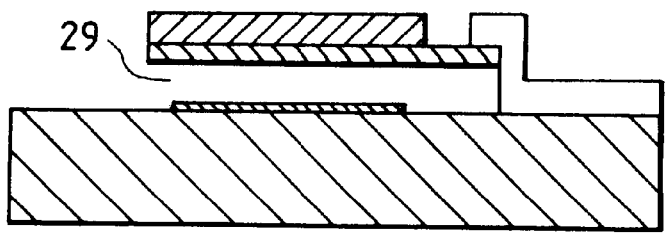

Thereafter, an Al film 27 was formed on the lever and the movable electrode to a thickness of 1 μm for the support members by means of sputtering, a type of vacuum deposition, using an Al target (FIG. 2H). Then, photoresist 102 was applied on the Al film, exposed to light and photochemically developed (FIG. 2I) and the Al film 27 was subjected to a patterning operation, using an Al etchant consisting of phosphoric acid, nitric acid and acetic acid to produce the pattern of the support member 13' on the torsion bar 11 (FIG. 2J). Finally, the photoresist 102 and the PMMA of the resin film under the movable electrode were etched out to produce a void 29 by oxygen plasma. Thus, an electrostatic actuator having a profile as shown in FIG. 3 was produced, the electrostatic actuator having a torsion bar type beam of bulk (crystalline) Si provided with a void 29 and supported by the Al film as shown in FIG. 2K. The electrodes of the electrostatic actuator were not etched out by oxygen plasma and the problem of sticking that may arise when the sacrificial layer is removed by wet etching was successfully avoided.

With the method of the present invention, since a microstructure comprising a movable electrode and a lever was formed from a bulk (crystalline) Si substrate, a torsion bar type beam that was free from internal stress and hence warping was successfully prepared. The free end of the beam was displaced as the torsion bar was twisted to rotate when a voltage was applied to the movable electrode and the drive electrode.

Because resin film was used for the adhesive layer, the first substrate and the structure layer on the second substrate could be bonded together at temperature as low as 150° C. and materials having different thermal expansion coefficients could be selected for the substrates. As described earlier, for the purpose of the invention, the resin film plays the role of an adhesive for bonding the first substrate and the structure layer on the second substrate and, at the same time, that of a sacrificial layer for forming a microstructure.

By applying resin film on the first substrate, it was made possible to smooth out the surface of the substrate that had been undulated by the components arranged there including the drive electrode and the movable electrode in order to produce a smooth bonding surface and achieve a good bonding effect for the substrates. While the adhesive layer was formed on the first substrate, which was then bonded with the structure layer on the second substrate in the above example, the adhesive layer may alternatively be arranged on the structure layer on the second substrate or an adhesive layer may be formed on both the first substrate and the structure layer on the second substrate to produce a beam.

With the method of forming a microstructure according to the invention, a movable electrode is formed with a p$^+$ layer and then the pattern of a lever is formed on the back side of the structure layer as viewed from the movable electrode. With this arrangement, they may be made to show respective profiles that are not affected by each other.

While an Al thin film was formed for the support members in the above example, it may be appreciated that an electrically insulated microstructure can be formed on the substrate by the same process if the Al thin film is replaced by a sacrificial layer of resin film formed by vacuum deposition and an insulating film such as silicon dioxide film formed at temperature that does not damage the adhesive layer. Similarly, while a glass substrate was used for the first substrate in the above example, it may be replaced by a substrate of an insulating material such as quartz, $Al_2O_3$, MgO or $ZrO_2$, a semiconductor such as Si, GaAs or InP or a metal, using the same process.

Example 2

Figure 5H:
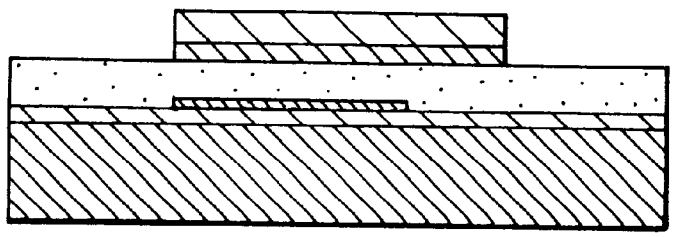
FIGS. 5H to 5L are schematic illustrations showing steps to be followed after those of FIGS. 4A to 4G.
Figure 5I:
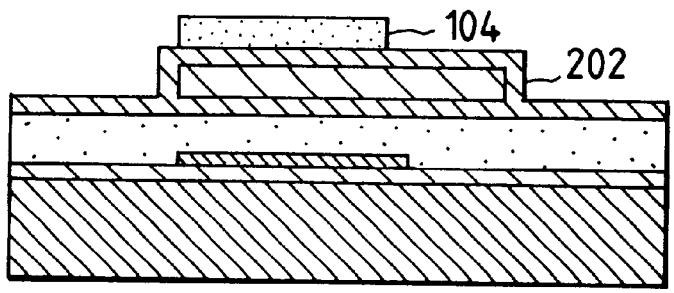
Figure 5J:
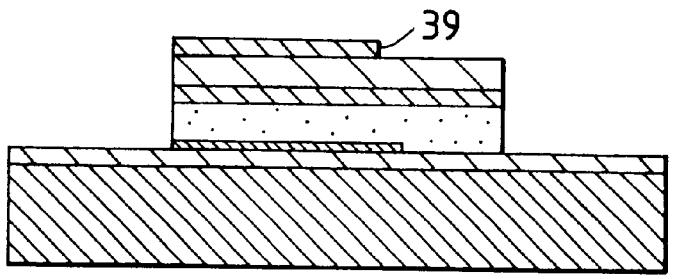
Figure 5K:
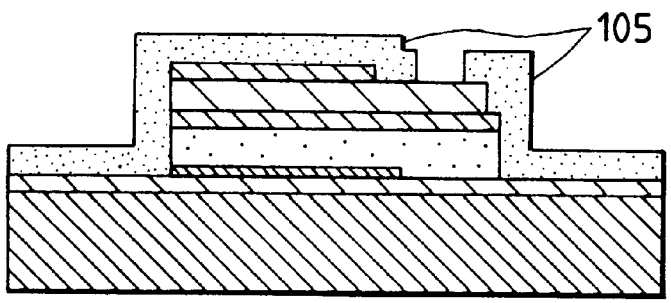
Figure 5L:
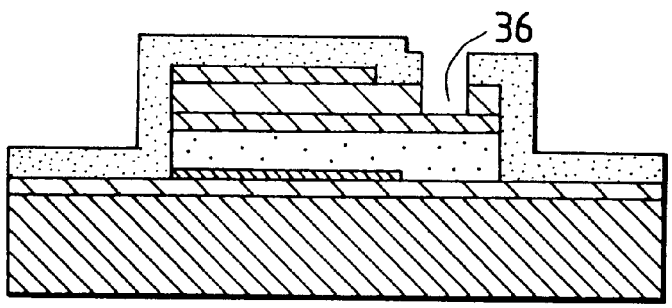
Figure 6M:
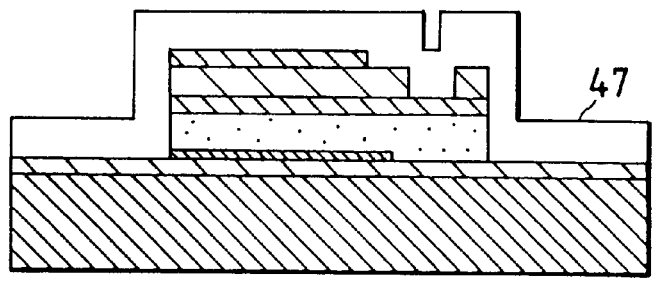
FIGS. 6M to 6P are schematic illustrations showing steps to be followed after those of FIGS. 5H to 5L.
Figure 6N:
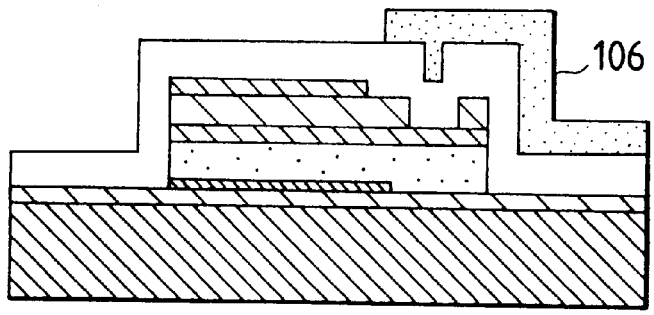
Figure 6O:
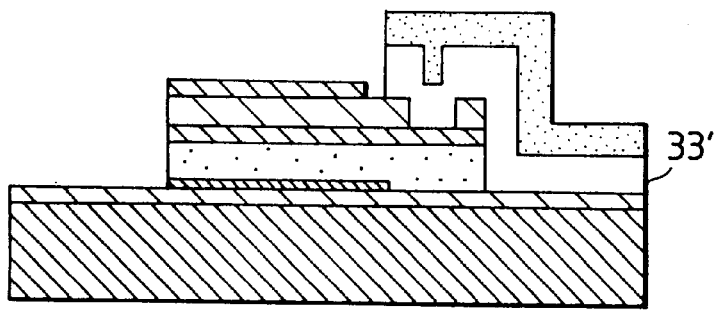
Figure 6P:
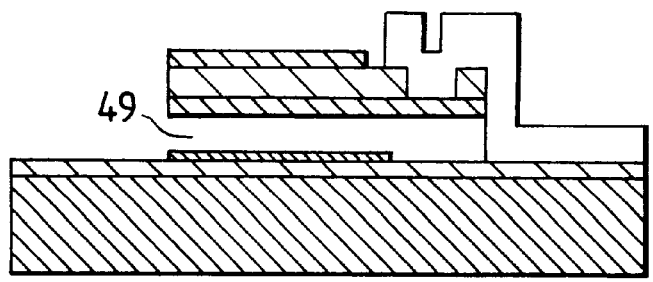
Figure 7:
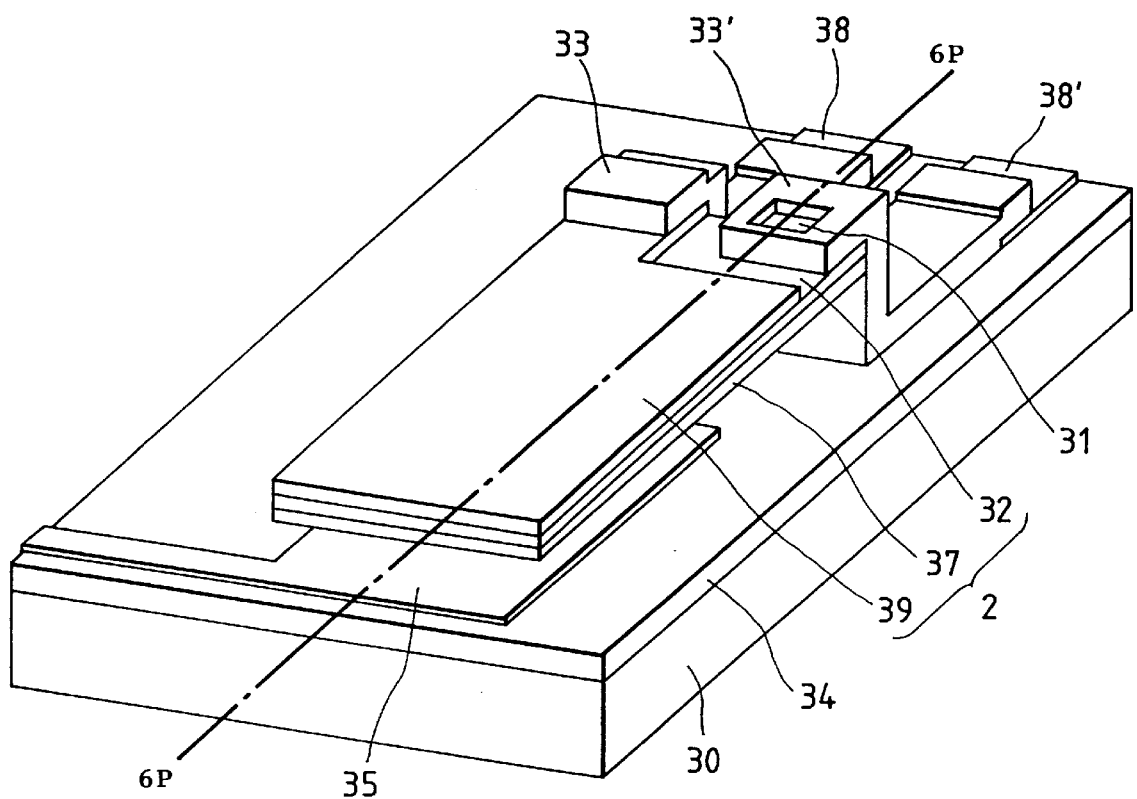
FIG. 7 is a schematic perspective view of an electrostatic actuator prepared by the method of forming a microstructure according to the invention.

FIGS. 4A to 6P illustrate different steps of forming a microstructure in another mode of carrying out the method according to the invention and FIG. 7 is a schematic perspective view of a microstructure prepared by the method. FIG. 8 is an exploded view of the beam section of the microstructure, illustrating the multilayer structure of the beam, which beam 2 comprises a lever 32, a movable electrode 37 and a dummy electrode 39. As seen from FIGS. 7 and 8, the microstructure comprises a first substrate 30 which is an Si substrate, an insulation layer 34 of silicon dioxide film, a drive electrode 35 formed on the insulation layer 34 and a pair of fixed electrodes 38, 38' of thin film formed also on the insulation layer 34. The lever 32 is a cantilever of patterned silicon dioxide film and held at the upper surface thereof by a pair of support members 33, 33' of an electroconductive material with a void interposed therebetween. A movable electrode 37 and a dummy electrode 39 are arranged respectively on the lower surface and on the upper surface of the lever 32. The support member 33 electrically connects the dummy electrode 39 and the fixed electrode 38. The support member 33' electrically connects the movable electrode 37 and the fixed electrode 38' by way of a contact hole 36 formed in the lever 32 by means of a contact 31. The microstructure having a configuration as described above operates as a cantilever type electrostatic actuator that can be bent and deformed by applying a voltage to the drive electrode 35 and the fixed electrode 38' connected to the movable electrode 37 disposed on the lower surface of the lever 32 by way of the support member 33'.

In the electrostatic actuator, the beam 2 is suspended by the support members 33, 33' at the upper surface thereof with a void interposed therebetween and the support members 33, 33' mechanically and electrically connect the beam 32 onto the insulation layer 34 and the fixed electrodes 38, 38' to produce an air bridge structure. The beam is bent and deformed to displace the free end of the beam toward the substrate when a voltage is applied to the drive electrode 35 and the fixed electrode 38'.

With an electrostatic actuator having a configuration as described above, the distance between the movable electrode and the drive electrode can be reduced by the thickness of the beam if compared with a case where the movable electrode is arranged on the upper surface because the movable electrode is disposed on the lower surface of the beam so that the voltage required to be applied to the electrodes in order to displace the beam can also be reduced. Additionally, the dummy electrode arranged on the upper surface of the lever 32 effectively prevents the microstructure from being bent by the internal stress found within the lever 32 and the thin movable electrode 37 because of the vertically symmetrical arrangement of the dummy electrode and the movable electrode relative to the lever. In shorts, the dummy electrode operates to cancel any possible bent on the part of the lever.

In an experiment, a microstructure as shown in FIGS. 4A to 7 was prepared. FIGS. 4A to 6P illustrate the microstructure in cross section taken along line 6P—6P of FIG. 7 in different manufacturing steps.

Figure 4A:
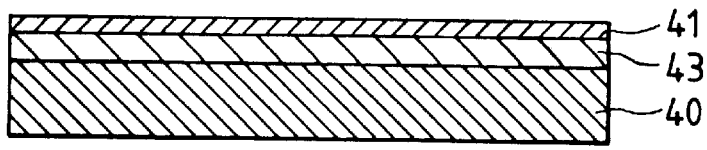
FIGS. 4A to 4G are schematic illustrations showing steps of forming a microstructure in another mode of carrying out the method according to the invention.
Figure 4B:
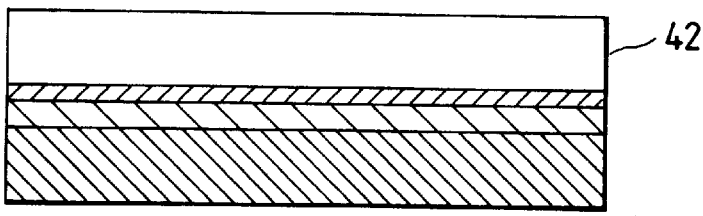

In order to form a second substrate provided with a structure layer, an Si substrate 40 was thermally oxidized by using an oxidizing gas (a mixture gas of oxygen and hydrogen) to form a structure layer 43 of silicon dioxide having a thickness of 1 μm and then a sacrificial layer for pattern transfer 41 of Al film was formed by electron beam vapor deposition, which is a technique to form a thin film by deposition, to a thickness of 200 nm (FIG. 4A) before the second substrate 42 of a glass substrate (#7740 Corning: tradename) and the sacrificial layer for pattern transfer 41 were bonded together by anode coupling (FIG. 4B).

The process of anode coupling will now be described by referring to FIG. 9. In FIG. 9, reference numeral 63 denotes a power source for applying a voltage to the sacrificial layer for pattern transfer (Al film) formed on the Si substrate 40 having a structure layer 43 of silicon dioxide film and the second substrate 42 of glass substrate, said power source being connected to needle electrodes 61 and 65 by way of lead wires 62 and 64 respectively. Reference numeral 60 denotes a platen provided with a heater. The second substrate 42 was placed on the sacrificial layer for pattern transfer (Al film) 41 and a voltage of 500 V was applied for 20 minutes from the power source 63 to the second substrate and the sacrificial layer for pattern transfer to bind them together, while maintaining the temperature of the platen to 300° C.

Figure 4C:
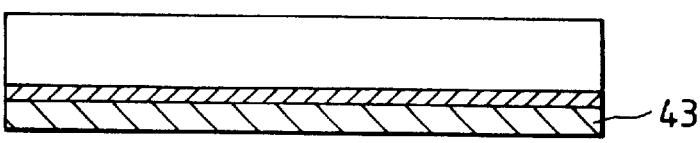
Figure 4D:
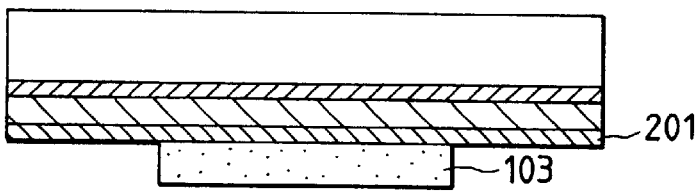

Thereafter, the Si substrate 40 was removed by etching in a KOH 30 wt % aqueous solution heated to 100° C. to produce the second substrate carrying thereon the structure layer 43 and the sacrificial layer for pattern transfer (FIG. 4C). The structure layer of silicon dioxide film was not etched by wet etching using the alkaline aqueous solution because it is resistant against alkaline wet etching.

Subsequently, an electroconductive thin film 201 was formed on the structure layer 43 for the movable electrode. This was done by successively forming a Cr film and an Au film to respective thicknesses of 5 nm and 400 nm by electron beam vapor deposition, patterning a photoresist layer 103 in a photolithography process (FIG. 4D) and then patterning the Cr and Au layers for the movable electrode respectively by means of an Au etchant, which was an aqueous solution of iodine and potassium iodide, and a Cr etchant, which was an aqueous solution of cerium ammonium nitrate and perchloric acid to make them show the profile of the movable electrode as shown in FIG. 8, using the mask of photoresist 103. The photoresist 103 was then removed by means of a resist stripping solution. Additionally, photoresist was applied anew to the structure layer 43 and then patterned to the profile of a lever without a contact hole by photolithography and then the structure layer 43 was subjected to a reactive ion etching (RIE) operation to produce the pattern of the lever 43 without a contact hole by using the mask of photoresist and $CF_4$ gas. The photoresist was then stripped off by means of a resist stripping solution (FIG. 4E).

An Si substrate 30 carrying thereon an insulation layer 34, a drive electrode 35 and a pair of fixed electrodes 38, 38' (not shown) was used for the first substrate. The insulation layer 34 is a silicon dioxide film formed by thermally oxidizing part of the Si substrate 30 to a thickness 1pm by means of oxidizing gas. The drive electrode 35 and the fixed electrodes 38, 38' were prepared by forming electroconductive layers of an Cr film (5 nm) and an Au film (100 nm) and patterning them appropriately as in the case of preparing the movable electrode 37. Then, an adhesive layer 46 was formed on the first substrate by applying resin with a spinner. The resin was a rubber type resist OMR-83 (tradename) available from Tokyo Ohka Co., Ltd. (FIG. 4F).

Figure 4E:
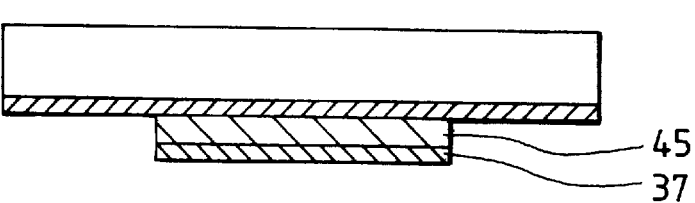
Figure 4F:
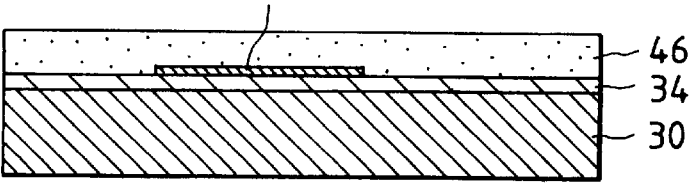
Figure 4G:
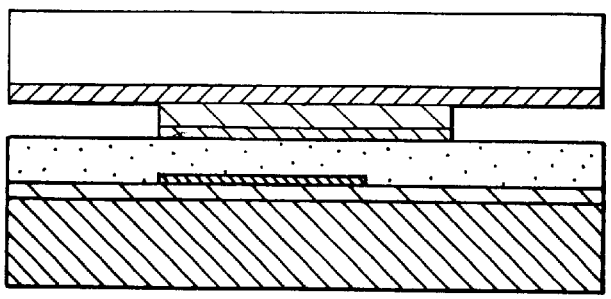

After forming the adhesive layer 46, the second substrate of FIG. 4E and the first substrate of FIG. 4F were pressed against each other from the rear sides thereof and heat treated at 150° C. to heat set the resin of the adhesive layer and rigidly bind the substrates together as shown in FIG. 4G. The adhesive layer showed a thickness of 2 $\mu$m after the heat setting operation.

Thereafter, the sacrificial layer for pattern transfer 41 was removed by an Al etchant containing phosphoric acid nitric acid and acetic acid and heated to 80° C. to release the second substrate. As a result, the structure layer that had been patterned to show a beam-like profile and the movable electrode were transferred onto the adhesive layer of the first substrate.

Subsequently, a dummy electrode 39 was prepared by forming a metal layer 202 of a Cr film (5 nm) and an Au film (100 nm), applying photoresist 104 thereto, patterning them appropriately in a photolithography process as in the case of preparing the drive electrode 35 and the fixed electrodes 38, 38' (FIG. 5I) and then etching the metal layer 202, using the mask of the photoresist 104 and Au and Cr etchant. Thereafter, the structure layer having the pattern of a lever was used as a mask in an operation of patterning the resin adhesive layer to produce there a pattern same as that of the lever pattern by RIE using oxygen gas.

Then, photoresist 105 was applied to the structure layer having the lever pattern and subjected to a patterning operation in a photolithography process (FIG. 5K) and the patterned photoresist 105 was used as a mask to etch the structure layer by reactive ion etching (RIE) using $CF_4$ gas and produce a contact hole 36 (FIG. 5L). Thereafter, the photoresist 105 was removed by reactive ion etching (RIE) using oxygen gas. Then, an Al film 42 was formed to a thickness of 2 m for a support layer on the lever 32 of silicon dioxide prepared in a manner as described above and the movable electrode 37 under the contact hole 36 as well as on the dummy electrode 39 (FIG. 6M). Photoresist 106 was formed on the Al film and patterned in a photolithography process (FIG. 6N). Subsequently, the Al film 47 was patterned by means of an Al etchant containing phosphoric acid, nitric acid and acetic acid and heated to 50° C. to produce support members 33, 33' (FIG. 6O, where the support member 33 is not shown). With the above arrangement, the support member 33' electrically connected the movable electrode 37 and the fixed electrode 38' (not shown) by way of the contact hole, while the support member 33 electrically connected the dummy electrode 39 and the fixed electrode 38 (not shown).

Finally, the photoresist 106 and the adhesive layer of resin under the movable electrode were etched out by oxygen plasma to produce a void 49 (FIG. 6P). Thus, a microstructure that had a configuration as shown in FIG. 7 and comprised a 1 $\mu$m thick cantilever type beam 2 of silicon dioxide film carrying electrodes on the upper and lower surfaces and mechanically held by an Al film was produced with a void provided between the cantilever and the substrate. With the above method, the beam, the support members and the electrodes were left intact during the etching operation using oxygen plasma and the problem of sticking that may arise when the sacrificial layer is removed by wet etching was successfully avoided.

With the above method again, a movable electrode could be formed on the lower surface of the beam and electrically connected with a fixed electrode formed on the first substrate via a support member. When a voltage of 20 V was applied to the movable electrode and the drive electrode of the electrostatic actuator having a 100 $\mu$m long cantilever, the free end of the beam was displaced toward the first substrate by about 0.5 $\mu$m with the bending motion of the cantilever.

The dummy electrode arranged on the upper surface of the beam effectively canceled any possible bent of the beam that could be produced by the internal stress of the movable electrode 37 under the lever 32. For the purpose of comparison, a cantilever type beam of silicon dioxide film that did not carry any movable electrode and dummy electrode was prepared to find out that no bending was observable on the part of the beam. While it is very difficult to eliminate the intrinsic stress generated in a thin silicon dioxide film during the process of preparing it by vacuum deposition, a silicon dioxide film produced by oxidizing bulk Si is amorphous and homogeneous and therefore it is not bent in the form of a monolayer. In this example, the Au layer was made as thick as 400 nm, which was close to the thickness of the silicon dioxide film. For the purpose of comparison, an electrostatic actuator having a beam that was not provided with a dummy electrode in FIG. 7 was also prepared to find that the free end of the beam was bent away from the first substrate by more than 1 $\mu$m. This was because the Au film formed by vapor deposition for the movable electrode was subjected to compression stress. When the beam of an electrostatic actuator according to the invention is bent upward, the distance between the movable electrode and the drive electrode is enlarged so that a higher voltage is required do drive the beam to move by a distance comparable to that of displacement of the beam of an electrostatic actuator without such bending. The beam of an electrostatic actuator with a movable electrode made of Ag and without a dummy electrode prepared for comparison was bent downward to reduce the distance between the first substrate and the free end of the beam and proved to be inoperative because of the reduced gap between the substrate and the beam. Thus, any possible bending of the lever of an electrostatic actuator according to the invention that is attributable to the fact that the lever is made as thin as the movable electrode section can be effectively canceled by arranging a dummy electrode section on the upper surface of the lever to ensure vertical symmetry for the lever.

Referring to FIG. 6O showing a dummy electrode, it can be utilized to take out the tunnel current that may be generated between opposite surfaces of a specimen to be observed by arranging a probe of an electroconductive material on the dummy electrode according to the method proposed by Spindt (C. A. Spindt, et al., "Physical properties of film field emission cathode with molybdenum cones", J. Appl. Phys., 47. 1976, pp. 5248–5263) so that an STM probe provided with an electrostatic actuator can be prepared by removing the photoresist 106 and the adhesive layer. It is also possible to use the dummy electrode as a shield electrode for cutting off any external electric fields that can generate noise other than the noise produced by the electric field of the drive electrode by grounding the dummy electrode. While the structure layer of this example was provided with a single dummy electrode and a single movable electrode, it may alternatively be provided with more than one dummy electrodes and more than one movable electrodes.

If a structure layer is prepared after forming a movable electrode by means of a thin film deposition technique, the pattern of the drive electrode is transferred to the structure layer also on the stepped areas of the pattern of the movable electrode. However, since the pattern of the beam is formed on the structure layer after forming the movable electrode to be ultimately arranged on the structure layer vis-a-vis the first substrate, a beam can be formed from a flat structure layer regardless of the stepped areas of the pattern of the movable electrode. Additionally, since the structure layer carrying an electrode section is transferred onto the first substrate in a reversed manner, the electrode section can be formed vis-a-vis the first substrate.

The first substrate can be provided with a very flat and smooth surface by applying resin thereto regardless of the undulations produced by the drive electrode and the fixed electrodes so that the substrates can be firmly bonded together as a very flat adhesive surface is prepared for them. Additionally, as photoresist is used for the resin layer, a microstructure can be formed without problem if an Si substrate 30 carrying thereon integrated circuits is sued for the first substrate. Since photoresist scarcely contains mobile ions, they hardly penetrate into electronic devices such as MOS transistors to interfere with the proper operation of such devices. While Si is used for the substrate, it may be replaced by a glass substrate or a substrate of some other material selected from GaAs, metals and metal film.

In the step of bonding the structure layer and movable electrode and the first substrate with an adhesive layer arranged therebetween as shown in FIG. 4G, a voltage of 100 V may be applied to the Al of the sacrificial layer for pattern transfer 41 and the Si substrate of the first substrate to generate electrostatic force and the generated electrostatic force may be utilized to press the substrates against each other from the back sides in stead of applying physical pressure to the substrates from the rear side. While Al film is used for the sacrificial layer for pattern transfer in the above description, Ti, Ni or some other metal that can be bonded by anode coupling may alternatively be used in combination with an etchant that does not corrode the resin film and the structure layer to produce a similar microstructure. Since grooves are formed on the bonding surface of the second substrate by the pattern of the beam shown in FIG. 4E, any vapor of the solvent generated when the resin film is heat set in the step of FIG. 4G can be made to escape through the grooves. If no such grooves are formed, bubbles of the evaporated solvent produced in the heat setting process can be trapped between the adhesive layer and the structure layer unless the concentration of the solvent contained in the resin solution to be applied to the substrate is rigorously controlled. This problem is eliminated by providing grooves.

As described earlier, the resin film operates as an adhesive layer for bonding the first substrate and the structure layer and, at the same time, takes the role of a sacrificial layer for forming a microstructure.

What is claimed is:

1. A microstructure comprising:
   a substrate;
   a support member formed on said substrate; and
   a beam suspended from said support member in a manner to be separated from said substrate by an air space, said beam having an electrode on a bottom surface thereof;
   wherein said support member is comprised of a member formed of a thin metal film with a portion of said support member attached to a top surface of said beam and a portion directly attached to said substrate.

2. A microstructure comprising:
   a substrate;
   a support member formed on said substrate; and
   a beam suspended from said support member in a manner to be separated from said substrate by an air space, wherein said beam is made of a thin film of an insulating material and has an electrode on a bottom surface thereof;
   wherein said support member is comprised of a member formed of a single material with a portion of said support member attached to a top surface of said beam and a portion directly attached to said substrate.

3. A microstructure according to claim 1, wherein said metal thin film is made of aluminum.

4. A method of forming a microstructure according to claim 1 which comprises steps of:
   forming a structure layer on a second substrate, forming an electrode section of an electroconductive material on said structure layer,
   forming an adhesive layer of resin film on a first and/or said second substrate,
   joining said first substrate and the structure layer and electrode section with said adhesive layer,
   removing said second substrate,
   forming a support layer for connecting said structure layer and electrode section to said first substrate and
   removing said adhesive layer.

5. A method of forming a microstructure according to claim 4, wherein said step of forming said adhesive layer is carried out by applying a solution of resin diluted by a solvent to form a thin film.

6. A method of forming a microstructure according to claim 4, wherein said resin film is made of photoresist.

7. A method of forming a microstructure according to claim 6, wherein said photoresist contains cyclopolymerized rubber.

8. A method of forming a microstructure according to claim 4, wherein a groove ia formed on said first and/or second substrates.

9. A method of forming a microstructure according to claim 4, wherein said joining step includes a step of applying pressure to said first and second substrates.

10. A method of forming a microstructure according to claim 9, wherein said step of applying pressure is carried out by applying a voltage to said first and second substrates.

11. A method of forming a microstructure according to claim 4, wherein said support layer is made of metal thin film.

12. A method of forming a microstructure according to claim 4, wherein said step of removing said adhesive layer is carried out by dry etching using oxygen.

13. A method of forming a microstructure according to claim 12, wherein said dry etching is plasma etching.

14. A method of forming a microstructure according to claim 4, wherein said second substrate for forming a structure layer is an SOI substrate.

15. An electrostatic actuator comprising:
   a substrate;
   a drive electrode and a fixed electrode formed on said substrate;
   a beam suspended from said support member in a manner to be separated from said substrate by an air space, said beam having a movable electrode located so as to be opposite to said drive electrode;
   wherein said support member is formed of only one member of an electroconductive material, and is comprised of a portion attached to a reverse surface of said beam to said surface opposite said substrate and a portion directly attached to said fixed electrode, and said fixed electrode and said movable electrode are electrically connected to each other by said support member.

16. An electrostatic actuator according to claim 15, wherein said beam has a further electrode on said reverse surface to said surface opposite said substrate.

17. An electrostatic actuator according to claim 15, wherein said movable electrode and said beam constitute one member.

* * * * *

UNITED STATES PATENT AND TRADEMARK OFFICE
CERTIFICATE OF CORRECTION

PATENT NO.   : 5,994,750
DATED        : November 30, 1999
INVENTOR(S)  : TAKAYUKI YAGI It is certified that error appears in the above-identified patent and that said Letters Patent is hereby corrected as shown below:

ON THE TITLE PAGE

[56] References Cited, under OTHER PUBLICATIONS:

After Zhu, J., et al., "Processing" should read --Proceedings--.

COLUMN 1:

Line 11, "small one or more than one" should read --small, one or more than one,--;
    Line 23, "Firstly," should read --First,--;
    Line 40, "profile and subsequently" should read --profile. Subsequently--;
    Line 47, "microstructure and hence" should read --microstructure. Hence--;
    Line 50, "an" should read --a--; and
    Line 57, "Secondly," should read --Second,--; and "a method" should read --method--.

COLUMN 2:

Line 3, "drying" should read --dry--;
    Line 4, "(RIE) and any" should read --(RIE). Any--;
    Line 6, "if" should read --when--,
    Line 7, "can be" should read --is thus--;
    Line 9, "at" should read --at a--;
    Line 10, "photoresist" should read --the photoresist--;
    Line 11, "to impose" should read --thus imposing--;
    Line 15, "so controlled as" should read --controlled--;
    Line 20, "coupling" should read --coupling,--;
    Line 24, "an" should read --a--;

UNITED STATES PATENT AND TRADEMARK OFFICE
CERTIFICATE OF CORRECTION

PATENT NO. : 5,994,750
DATED : November 30, 1999
INVENTOR(S) : TAKAYUKI YAGI

Page 2 of 7

It is certified that error appears in the above-identified patent and that said Letters Patent is hereby corrected as shown below:

COLUMN 2:

Line 39, "at" should read --at a--;
Line 56, "above identified" should read --above-identified--;
Line 58, "of" should read --for--;
Line 61, "substrate" should read --substrate,--;
Line 65, "charac-" should be deleted; and
Line 66, "terised in that it comprises" should read --comprising the--.

COLUMN 3:

Line 10, "electrode characterized in that the" should read --electrode. The--;
Line 11, "avoid" should read --a void--;
Line 12, "space" should read --space,--;
Line 18, "electrode which" should read --electrode. The--; and
Line 57, "joined well" should read --well joined--.

COLUMN 4:

Line 5, "disregarding" should read --independently of--;
Line 52, "technique" should read --techniques--;
Line 58, "an" should read --a--;
Line 59, "little" should read --few--;
Line 60, "ions" should read --ions,--;
Line 61, "used" should read --be used--; and
Line 62, "rubber type" should read --rubber-type--.

UNITED STATES PATENT AND TRADEMARK OFFICE
CERTIFICATE OF CORRECTION

PATENT NO.    : 5,994,750
DATED         : November 30, 1999
INVENTOR(S)   : TAKAYUKI YAGI It is certified that error appears in the above-identified patent and that said Letters Patent is hereby corrected as shown below:

COLUMN 5:

Line 1,  "used for rubber" should read --be used for rubber---;
    Line 2,  "negative type" should read --negative-type--;
    Line 29,  "an" should read --a--;
    Line 37,  "an" should read --a--;
    Line 38,  "patter" should read --pattern--;
    Line 53,  "an" should read --a--;
    Line 65,  "ion" should read --ions--; and
    Line 66,  "sodium) whereas the" should read --sodium).  The--; and
    Line 67,  "coupling" should read --coupling,--.

COLUMN 6:

Line 15,  "from" should read --from:--;
    Line 17,  "substrate," should read --substrate;--; "gas,"should read --gas;--; and "polishing" should read --polishing.--;
    Line 18,  "and the" should read --The--;
    Line 29,  "it" should read --the electrode--;
    Line 30,  "of" should read --of a--;
    Line 33,  "photolithography" should read --photolithography,--;
    Line 37,  "an" should read --a--;
    Line 43,  "made to evaporate" should read --evaporated--;
    Line 48,  "there," should be deleted;
    Line 57,  "he" should read --the--;
    Line 58,  "temperature" should read --temperatures--;
    Line 59,  "substrate" should read --substrates--;
    Line 60,  "coefficients" should read --coefficients,--;
    Line 62,  "the" should read --that--; and
    Line 67,  "layer" should --layer,--.

UNITED STATES PATENT AND TRADEMARK OFFICE
CERTIFICATE OF CORRECTION

PATENT NO.    : 5,994,750

DATED         : November 30, 1999

INVENTOR(S)   : TAKAYUKI YAGI

It is certified that error appears in the above-identified patent and that said Letters Patent is hereby corrected as shown below:

COLUMN 7:

Line 22, "electrode, of" should read --electrode.--;
    Line 23, "which the" should read --The--;
    Line 37, "microstructures" should read --microstructure--;
    Line 44, "above described" should read --above-described--;
    Line 56, "above described" should read --above-described--;
    Line 62, "are" should read --is--; and "connect" should read --connected--; and
    Line 63, "the structure" should read --to the structure--.

COLUMN 8:

Line 4, "film" should read --film,--.

COLUMN 9:

Line 28, "that used an" should read --using a--;
    Line 29, "iodine" should read --iodine,--;
    Line 36, "should be" should read --is--;
    Line 42, "at" should read --at a--;
    Line 52, "again" should read --against--; and
    Line 60, "was" should read --were--.

UNITED STATES PATENT AND TRADEMARK OFFICE
CERTIFICATE OF CORRECTION

PATENT NO.  : 5,994,750

DATED       : November 30, 1999

INVENTOR(S) : TAKAYUKI YAGI

It is certified that error appears in the above-identified patent and that said Letters Patent is hereby corrected as shown below:

COLUMN 10:

Line 33, "stress" should read --stress,--;
    Line 34, "warping" should read --warping,--;
    Line 47, "made" should be deleted;
    Line 49, "there" should read --there,--; and
    Line 50, "electrode" (second occurrence) should read --electrode,--.

COLUMN 11:

Line 20, "an" should read --a--; and
    Line 63, "shorts," should read --short,--.

COLUMN 12:

Line 1,  "cross section" should read --cross-section--;
    Line 4,  "an" should read --a--;
    Line 43, "an" should read --a--;
    Line 59, "An" should read --A--;
    Line 63, "lpm" should read --lpm--; and
    Line 66, "an" (both occurrences) should read --a--.

UNITED STATES PATENT AND TRADEMARK OFFICE
CERTIFICATE OF CORRECTION

PATENT NO.  : 5,994,750
DATED       : November 30, 1999
INVENTOR(S) : TAKAYUKI YAGI It is certified that error appears in the above-identified patent and that said Letters Patent is hereby corrected as shown below:

COLUMN 13:

Line 3,  "rubber type" should read --rubber-type--;
Line 15, "patterned" should read --patterned as shown in FIG. 5H--;
Line 19, "an" should read --a--;
Line 21, "appropriately" should read --appropriately as shown in FIG. 5I--;
Line 24, "(FIG. 5I)" should be deleted;
Line 28, "gas." should read --gas as shown in FIG. 5J.--; and
Line 32, "(FIG. 5K) and the" should read --(FIG. 5K). The--.

COLUMN 14:

Line 30, "do" should read --to--;
Line 36, "beam and proved" should read --beam. This proved--;
Line 62, "electrodes" should read --electrode--; and
Line 63, "trodes." should read --electrode.--.

COLUMN 15:

Line 16, "an" should read --a--;
Line 17, "sued" should read --used--; and
Line 32, "in stead" should read --instead--.

UNITED STATES PATENT AND TRADEMARK OFFICE
CERTIFICATE OF CORRECTION

PATENT NO. : 5,994,750
DATED : November 30, 1999
INVENTOR(S) : TAKAYUKI YAGI

It is certified that error appears in the above-identified patent and that said Letters Patent is hereby corrected as shown below:

<u>COLUMN 16</u>:

```
Line 14, "substrate, forming" should read --substrate,
         ¶forming--;
Line 23, "substrate" should read --substrate;--; and
Line 36, "ia" should read --is--.
```

Signed and Sealed this

Twentieth Day of March, 2001

NICHOLAS P. GODICI

Attest:

Attesting Officer

Acting Director of the United States Patent and Trademark Office